United States Patent
Inoue

(10) Patent No.: US 7,566,138 B2
(45) Date of Patent: Jul. 28, 2009

(54) LIGHT GUIDING BODY AND LIGHTING APPARATUS HAVING THE SAME

(75) Inventor: Masatomo Inoue, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 94 days.

(21) Appl. No.: 11/366,534

(22) Filed: Mar. 3, 2006

(65) Prior Publication Data

US 2006/0203463 A1  Sep. 14, 2006

(30) Foreign Application Priority Data

Mar. 8, 2005  (JP) .............................. 2005-063631

(51) Int. Cl.
*G01D 11/28* (2006.01)
(52) U.S. Cl. .............................. 362/30; 362/26; 362/551
(58) Field of Classification Search .................. 362/30, 362/24, 26, 29, 551, 556, 511, 555, 489; 200/314
See application file for complete search history.

(56) References Cited

U.S. PATENT DOCUMENTS

| 2,770,712 | A | * | 11/1956 | Dros | 362/26 |
|---|---|---|---|---|---|
| 3,518,386 | A | * | 6/1970 | Guberman | 200/313 |
| 3,632,938 | A | * | 1/1972 | Stessel | 200/314 |
| 4,163,883 | A | * | 8/1979 | Boulanger | 200/314 |
| 4,394,546 | A | * | 7/1983 | Harumatsu | 200/5 R |
| 4,670,633 | A | * | 6/1987 | Kaiwa et al. | 200/314 |
| 4,918,577 | A | * | 4/1990 | Furudate | 362/615 |
| 5,053,928 | A | * | 10/1991 | Pasco | 362/24 |
| 5,988,842 | A | * | 11/1999 | Johnsen et al. | 362/551 |
| 6,270,243 | B1 | * | 8/2001 | Simon | 362/560 |
| 6,880,945 | B2 | * | 4/2005 | Knaack et al. | 362/26 |
| 7,036,971 | B2 | * | 5/2006 | Kuo | 362/616 |
| 7,160,010 | B1 | * | 1/2007 | Chinniah et al. | 362/511 |
| 2005/0237766 | A1 | * | 10/2005 | Klettke | 362/612 |

FOREIGN PATENT DOCUMENTS

JP  2000-106049  4/2000

OTHER PUBLICATIONS

Machine translated documents of Kiyotaka et al. (JP 2000-106049).*
English Language Abstract of JP 2000-106049.

* cited by examiner

*Primary Examiner*—Sandra L O'Shea
*Assistant Examiner*—Gunyoung T Lee
(74) *Attorney, Agent, or Firm*—Greenblum & Bernstein, P.L.C.

(57) ABSTRACT

A light guiding body configured utilize light emitted by a light source for lighting and a lighting apparatus having the light guiding body are provided. The light guiding body has a base, lighting portions and leg portions. The base is formed by a light intake surface that is located in front of an LED. The lighting portions are formed by light emission surfaces. The leg portions individually extend from the base to the lighting portions. Each of the leg portions has a root portion that partially overlaps an area in front of the LED so that the leg portion can receive radiating light entering through the light intake surface. The lights received by the leg portions are respectively guided to the light emission surfaces.

18 Claims, 5 Drawing Sheets

LIGHT GUIDING BODY AND LIGHTING APPARATUS HAVING THE SAME

CROSS REFERENCE TO RELATED APPLICATIONS

The present disclosure relates to subject matter contained in priority Japanese Application No. 2005-063631, filed on Mar. 8, 2005, which is herein expressly incorporated by reference in its entirety.

BACKGROUND OF THE INVENTION

1. Field of the Invention

The present invention relates to a lighting apparatus configured to light a panel, and more particularly to a light guiding body contained in a lighting apparatus.

2. Description of Related Art

In the prior art, Japanese Laid Open Publication 2000-106049 discloses a lighting apparatus for lighting switch buttons of a vehicle mounted audio system from the rear side of the switch buttons. A lighting apparatus of this type has a light guiding body between a case of the vehicle mounted audio system and a circuit board inside the case. The light guiding body guides radiating light emitted by a light source, which is mounted on the circuit board, to the rear sides of the switch buttons, which are attached to the case.

Specifically, the above-mentioned light guiding body houses the light source in a recessed portion formed on a rear side of the light guiding body. By reflecting light laterally emitted by the light source to the front, the light guiding body illuminates light emission surfaces, which are formed at locations laterally spaced from front of the light source, and thus lights the switch buttons, which are attached to front faces of the light emission surfaces.

However, the lighting apparatus of JP 2000-106049 is not capable of efficiently guiding radiating light emitted by the light source to the light emission surfaces.

In other words, in the lighting apparatus of JP 2000-106049, light that is laterally emitted by the light source is guided to the light emission surfaces by reflection, so that light emitted in a forward direction, which is the most intensive among light emitted by the light source, is lost from the light guiding body and does not contribute to lighting.

SUMMARY OF THE INVENTION

The present invention is provided to address the above-described problems. Some objectives of the present invention include providing a light guiding body and a lighting apparatus having the same, the light guiding body being configured to efficiently utilize light emitted by a light source.

An aspect of the present invention provides a light guiding body configured to be positioned between a light source and a plurality of areas to be lighted to guide radiating light emitted by the light source to each of the areas to be lighted, the light guiding body including a base including a light intake surface configured to be positioned in front of the light source; a plurality of lighting portions, each the lighting portion including a light emission surface configured to be positioned behind the areas to be lighted; a plurality of leg portions, each the leg portion extending from the base to a respective one of the lighting portions; and each of the leg portions including a root portion that at least partially overlaps an area in front of the light source so that each the leg portion receives radiating light entering through the light intake surface, and each of the leg portions is configured in a shape to guide light received from the base to one of the light emission surfaces. Further, the root portion of each of the leg portions includes a reflection surface that is formed at a location facing the light source across the light intake surface, each the reflection surface having a shape to disperse reflected light emitted in a forward direction by the light source to a lateral direction, and wherein the reflected light is guided by each of the leg portions to one of the light emission surfaces. Each of the leg portions includes a cross section with a curved boundary so that light received from the base propagates while being repeatedly reflected inside each of the leg portions. Further, each of the leg portions forms a curved light path between the base and one of the light emission surfaces, so that light received from the base propagates while being repeatedly reflected inside each of the leg portions. Additionally, the areas to be lighted are located in positions laterally spaced from the front of the light source.

In a further aspect of the present invention, the leg portions are independent from each other. The leg portions may include a circular cross section. Further, the plurality of leg portions may include a plurality of upper leg portions, each the upper leg portion extending from the base to a separate respective lighting portion; and a plurality of lower leg portions, all of the lower leg portions extending from the base to one lighting portion. Each root portion includes an indentation therein positioned at a location facing the light source across the light intake surface. Additionally, a side surface of each of the indentations includes a reflection surface, each the reflection surface having a shape to disperse reflected light emitted in a forward direction by the light source to a lateral direction, and wherein the reflected light is guided by each of the leg portions to one of the light emission surfaces. Further, each the lighting portion includes a knurled surface thereon configured to guide light reflected from the reflection surface to the light emission surfaces.

A further aspect of the present invention includes a lighting apparatus including a light guiding body, a light source that emits light to the light guiding body; and a panel that covers the light guiding body and the light source; wherein areas to be lighted, that are laterally spaced from the front of the light source, are lighted from behind by the light emission surfaces of the light guiding body, the light emission surfaces being lighted by radiating light emitted by the light source. Further, the panel includes a panel main body and a plurality of switch buttons that can be pushed-in relative to the panel main body, and wherein the light guiding body is configured to individually light each of the switch buttons through the lighting portions that are respectively provided behind the switch buttons.

A further aspect of the present invention includes in combination, a pair of light guiding bodies; and a connection plate connecting the pair of light guiding bodies.

According to the present invention, since the root portion of each of the leg portions overlaps the area in front of the light source, the leg portions can receive via the overlapping areas light emitted by the light source in a forward direction and guide the light to the light emission surfaces, respectively. Therefore, according to the present invention, light emitted by the light source in the front direction can be effectively guided through the leg portions to the light emission surfaces, and thus can be effectively utilized for lighting the light emission surfaces.

According to this configuration, since a reflection surface is formed at the root portion of each of the leg portions, light emitted by the light source in the forward direction can be dispersed and reflected to lateral directions and can be guided by the leg portions to the light emission surfaces, thereby reducing the amount of lights escaped from the light guiding body in the front direction, and enabling effective use of the lights for lighting the light emission surfaces.

According to this configuration, since lights propagating while being repeatedly reflected in each of the leg portions are prevented from escaping outside of the leg portion during each reflection, brightness of the light emission surfaces can be enhanced. In other words, lights entering each of the leg portions propagate while being reflected by an exterior wall (an external boundary surface) of the leg portion. When the shape of the cross section of the leg portion has an angular portion, lights entering the angular portion have a tendency to escape outside. Therefore, as in the above-described configuration, making the boundary of the cross section of each of the leg portions curved can reduce the amount of lights escaping outside during each reflection, thereby making it possible to enhance the brightness of the light emission surfaces.

Although there is no restriction on a shape of a light path formed by each of the leg portions, it is preferable that each of the leg portions forms a curved light path between the base and one of the light emission surfaces, and lights received from the base propagate while being repeatedly reflected inside the leg portion.

According to this configuration, since light paths that smoothly connect the base and each of the light emission surfaces can be formed, compared to the case of bent light paths, an incidence angle (an angle formed by the direction with which the lights are approaching the exterior wall of the leg portion and an normal line of the exterior wall) of the lights can be made larger, thereby ensuring the lights are reflected by the exterior wall of the leg portion, and thus making it possible to reduce the amount of lights escaping from the leg portion.

It is preferable that the above-described lighting apparatus be so configured that the panel includes a panel main body and a plurality of switch buttons that can be pushed in relative to the panel main body, and that the light guiding body individually lights each of the switch buttons through the lighting portions that are provided respectively behind the switch buttons.

According to this configuration, the switch buttons to be pushed in are lighted from the behind, thereby enhancing their visibility for a user, and thus improving their operability.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF THE PREFERRED EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practiced.

Figure 1:
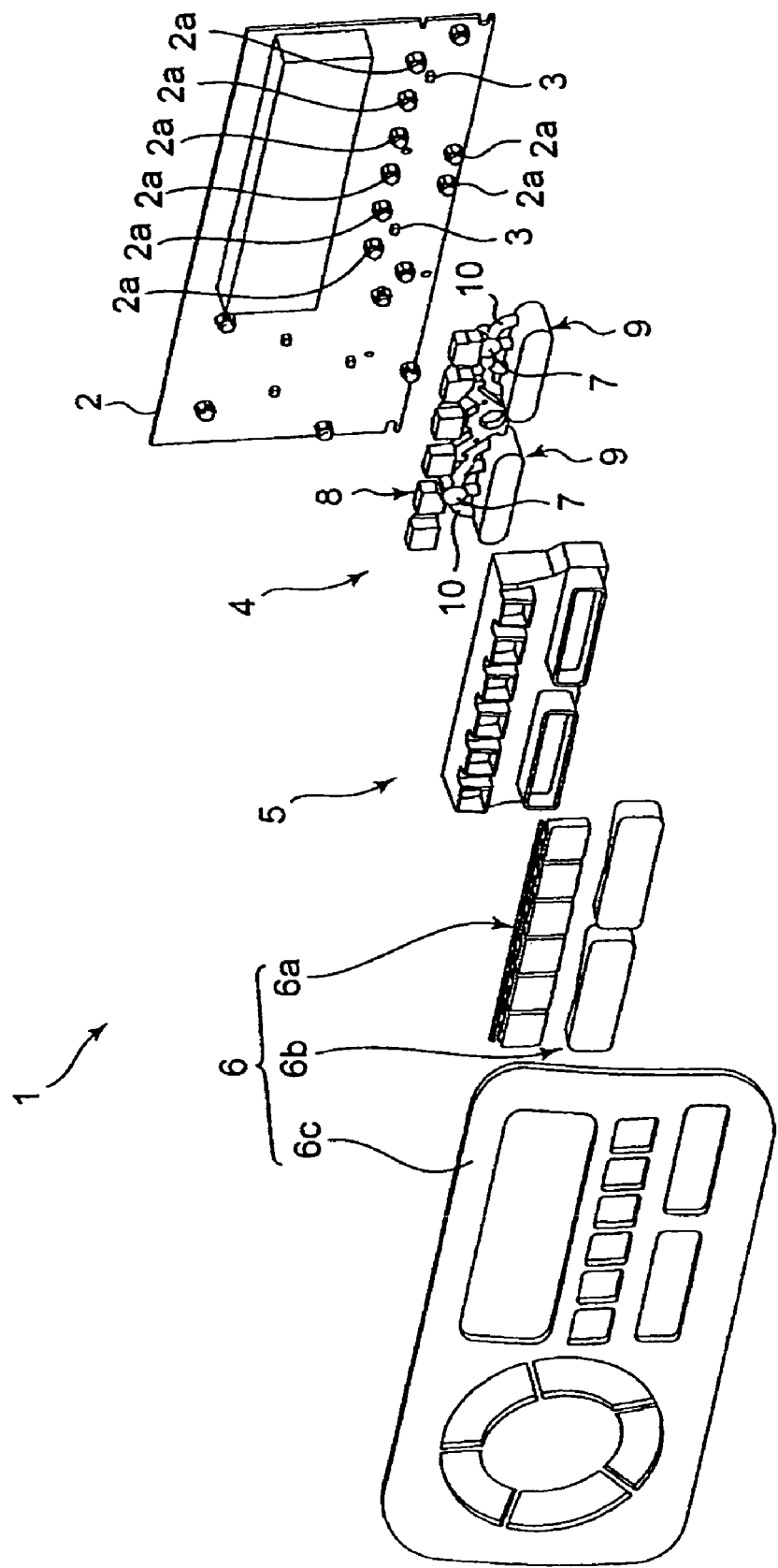
FIG. 1 is an exploded perspective view of a vehicle mounted audio apparatus according to an embodiment of the present invention.
Figure 2C:
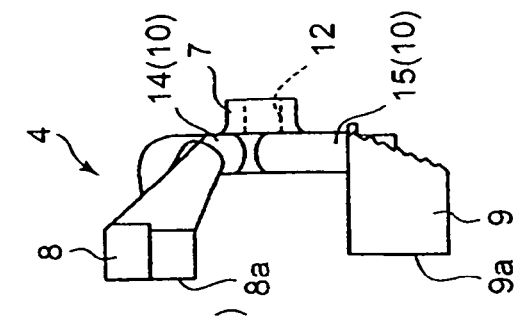
FIG. 2C is a right side view of the light guiding body of the audio apparatus of FIG. 1.
Figure 2A:
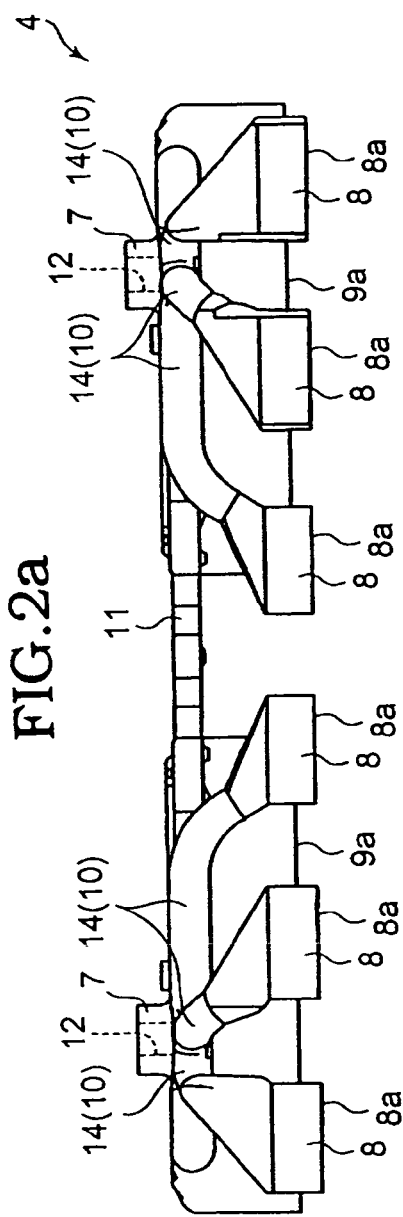
FIG. 2A is a top plan view of the light guiding body of the audio apparatus of FIG. 1.
Figure 2B:
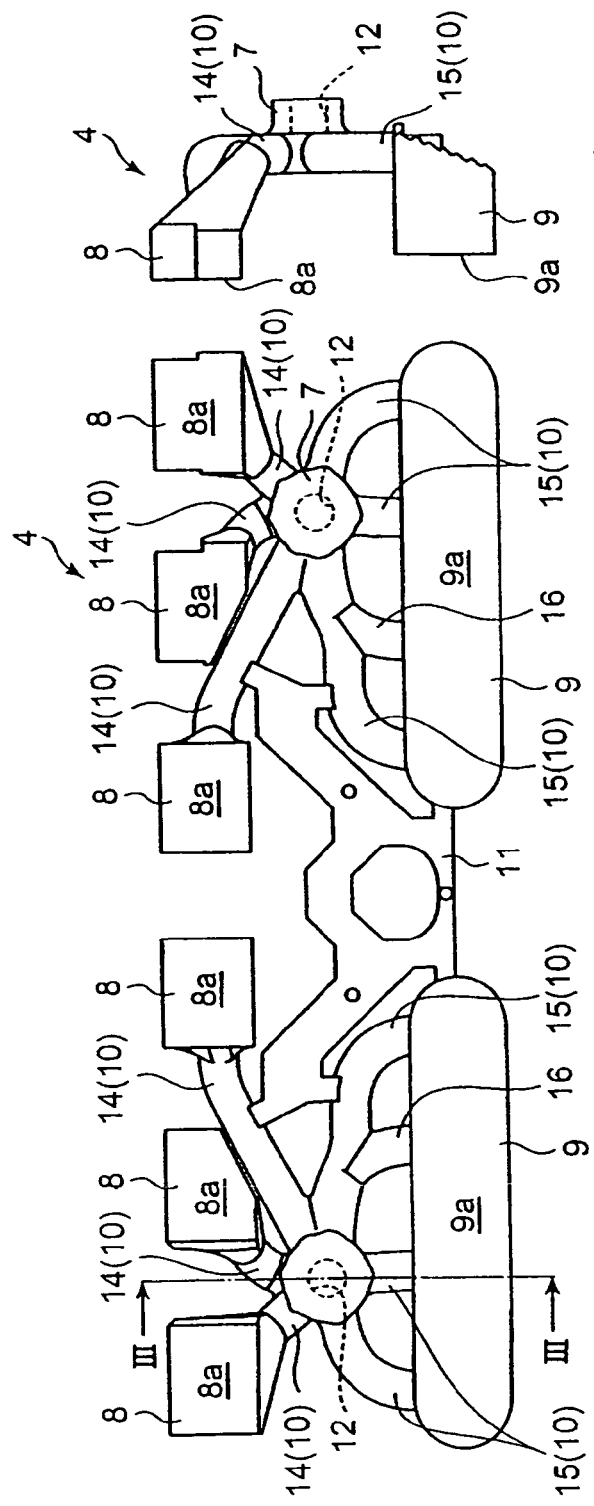
FIG. 2B is a front view of the light guiding body of the audio apparatus of FIG. 1.
Figure 3:
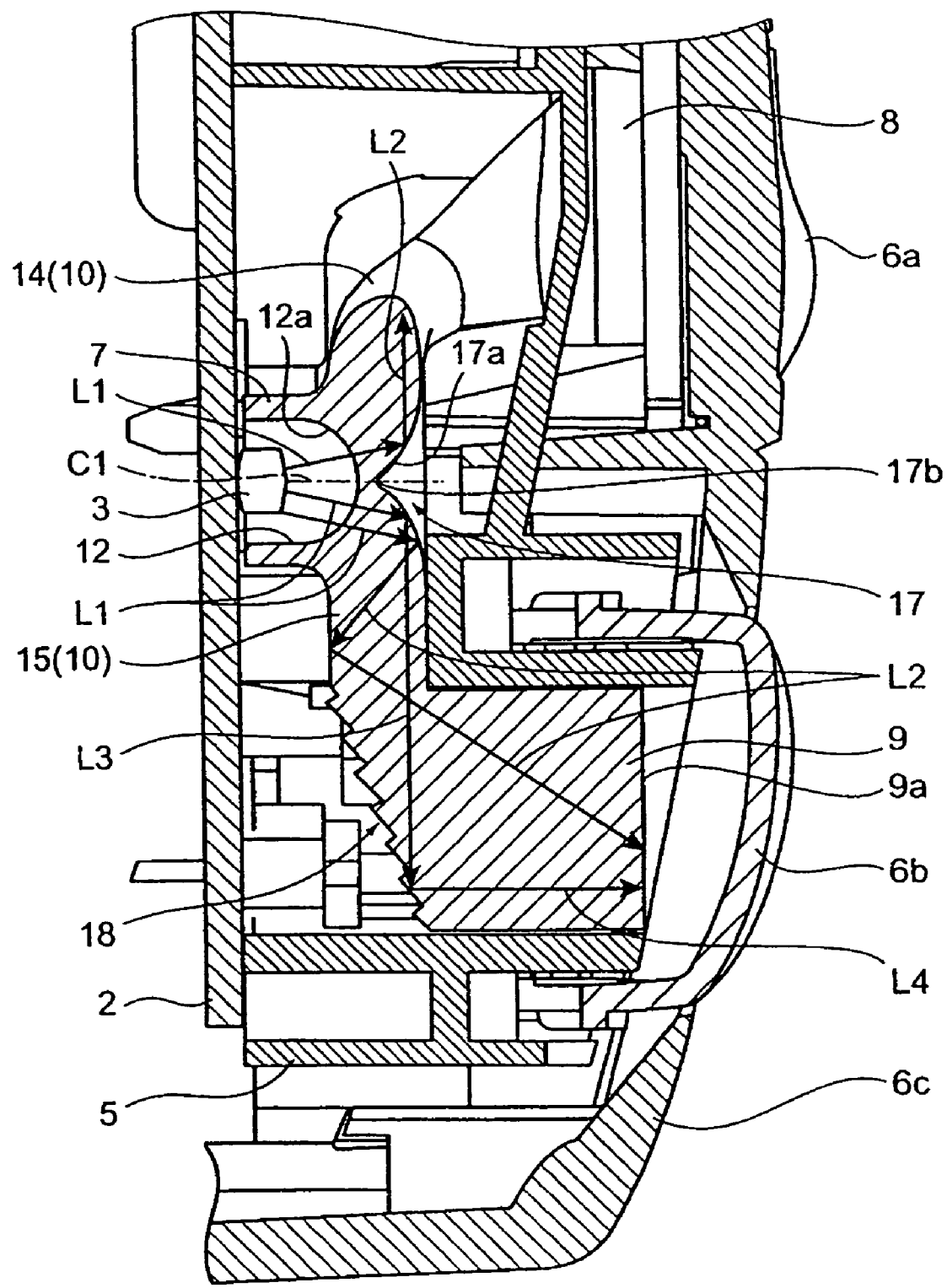
FIG. 3 is a cross-sectional view of the audio apparatus of FIG. 1, taken along the III-III line in FIG. 2B.

FIG. 1 is an exploded perspective view of a vehicle mounted audio apparatus according to an embodiment of the present invention. FIG. 2A is a top view of a light guiding body of the vehicle mounted audio apparatus shown in FIG. 1. FIG. 2B is a front view of the light guiding body of the vehicle mounted audio apparatus shown in FIG. 1. FIG. 2C is a right side view of the light guiding body of the vehicle mounted audio apparatus shown in FIG. 1. FIG. 3 is cross-sectional view of the audio apparatus shown in FIG. 1, taken along the III-III line in FIG. 2.

As shown by the figures, a vehicle mounted audio apparatus 1 of the present invention includes circuit board 2, light guiding body 4, light guiding body holder 5 and panel 6. Two light sources are mounted on circuit board 2. The light sources may include any appropriate light source, and in the present embodiment, include LEDs (light emitting diodes) 3. Light guiding body 4 is mounted on circuit board 2 so as to cover LEDs 3. Light guiding body holder 5 is attached to circuit board 2 so as to hold light guiding body 4 in a predetermined position. Panel 6 covers circuit board 2, light guiding body 4, and light guiding body holder 5. Six square buttons 6a and two horizontally elongated buttons 6b (switch buttons) are lighted from their rear sides by radiating lights emitted by LEDs 3 through light guiding body 4.

Light guiding body 4 may be constructed of any suitable light transmissible material such as, for example, a synthetic resin including a methacrylic resin. Light guiding body 4 may be formed integrally and includes a pair of bases 7, square lighting portions 8, horizontally elongated lighting portions 9, and a plurality of leg portions 10. Bases 7 are positioned in front of LEDs 3. Square lighting portions 8 and horizontally elongated lighting portions 9 are positioned on rear sides of square buttons 6a and horizontally elongated buttons 6b, respectively. Leg portions 10 each independently extend from one of bases 7 to one of lighting portions 8 and 9. As FIG. 2B shows in detail, light guiding body 4 according to the embodiment includes two combinations, each combination containing a base 7, lighting portions 8 and 9, and leg portions 10. The two combinations are arranged laterally in a symmetric layout; and the combinations are connected by connection plate 11. Accordingly, the light guiding body 4 includes a left side combination and a right side combination. The combination on the left side will be explained in the following description.

Recessed portion 12 is formed on the rear side of base 7, and houses LED 3. In other words, as FIG. 3 shows, in the present embodiment, a surface that forms a bottom portion of recessed portion 12 serves as light intake surface 12a. Light intake surface 12a is positioned in front of LED 3. Radiating light emitted by LED 3 enters light guiding body 4 through light intake surface 12a.

Square lighting portions 8 and horizontally elongated lighting portions 9 are formed to have cross sections that correspond in shape to cross sections of square buttons 6a and horizontally elongated buttons 6b, respectively. Surfaces of square lighting portions 8 and horizontally elongated lighting portions 9 are configured to form light emission surfaces 8a and 9a that light square buttons 6a and horizontally elongated buttons 6b from their rear sides, respectively.

Leg portions 10 are formed to have nearly circular cross sections that are configured to be smaller in area than the cross sections of square lighting portions 8 and horizontally elongated lighting portions 9. Each leg portion 10 extends in a curved line to connect base 7 to one of square lighting portions 8 and horizontally elongated lighting portions 9, while substantially maintaining the area and shape of its cross section.

In particular, leg portions 10 include three upper leg portions 14, that each extend upwardly from a front end portion (the end portion on the right side in FIG. 3) of base 7, three lower leg portions 15 that extend downwardly from the base 7, and branch leg portion 16 that branches out along the way from one of lower leg portions 15. Front ends of upper leg portions 14 each individually connect to one of square lighting portions 8, while front ends of lower leg portions 15 and branch leg portion 16 connect to the same horizontally elongated lighting portion 9. The plurality of leg portions 10 (lower leg portions 15 and branch leg portion 16) connecting to one horizontally elongated lighting portion 9 provides even exposure of the light emission surface 9a to light guided by lower leg portions 15 and branch leg portion 16, thereby preventing the occurrence of non-uniformity in brightness of light emission surface 9a along a widthwise or lateral direction of horizontally elongated lighting portion 9. The present invention may include any appropriate number of leg portions and/or branch portions connected to one horizontally elongated lighting portion 9, and in the present embodiment, four leg portions 15 and 16 connect to one horizontally elongated lighting portion 9. Alternatively, the present invention may include one leg portion connected to one horizontally elongated lighting portion in a one to one configuration.

Figure 4:
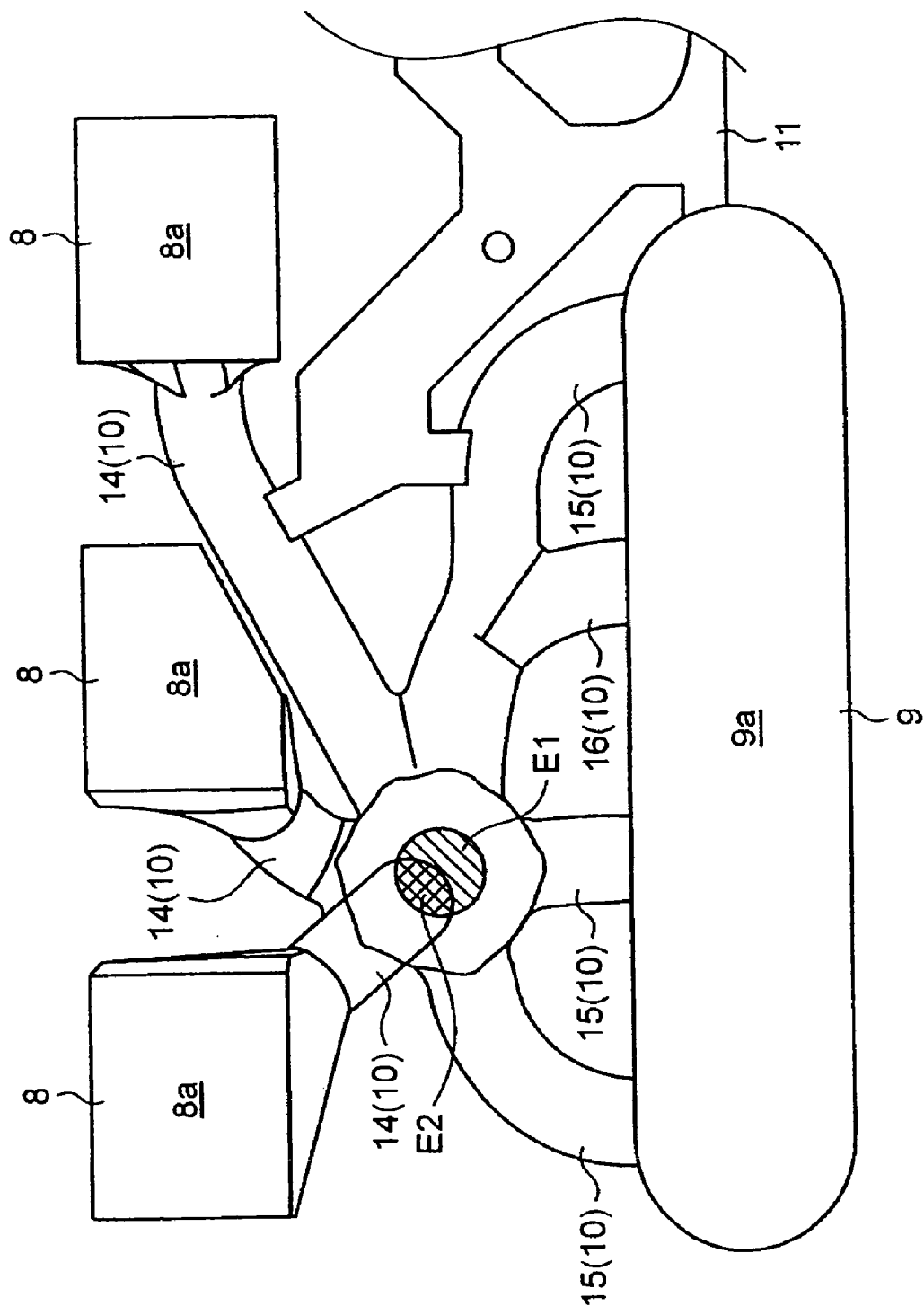
FIG. 4 is an enlarged front view of a portion of the light guiding body shown in FIG. 2B.

Further, as shown in FIG. 4, an area of the root portion of each of leg portions 10 overlaps a front area of LED 3, which is denoted by area E1 formed by recessed portion 12 in a front view. In FIG. 4, one of upper leg portions 14 is shown as an example. Therefore, light emitted by LED 3 in the forward direction enters leg portions 10 through overlapping areas E2 of area E1 and the root portions of leg portions 10, as shown by arrows L1 in FIG. 3. The light is guided to light emission surfaces 8a and 9a, while being repeatedly reflected inside leg portions 10, as shown by arrows L2.

Further, in the present embodiment, indentation 17 is formed on a front surface (the surface on the right side in FIG. 3) of the root portion of each of leg portions 10, at a location facing LED 3 across light intake surface 12a. Indentation 17 has a circular cross section in a front view, which is concentric with LED 3, and has a substantially isosceles triangular-shaped lateral cross section, of which two sides are formed by a pair of circular arcs that expand as they extend toward the upper and lower sides of the front surface. The base of the triangle extends beyond the boundary of LED 3 in a front view. In other words, indentation 17 has its apex 17b positioned on optical axis C that faces forward from LED 3, and has evenly shaped lateral cross sections around optical axis C.

Further, in the present embodiment, the side surface that forms the above-mentioned sides of indentation 17 forms reflection surface 17a.

Therefore, among radiating light shown by arrows L1 that is emitted by LED 3 and enters through light intake surface 12a, light headed for reflection surface 17a is reflected in a direction approximately parallel to circuit board 2, as shown by arrows L3, by reflection surface 17a that faces light intake surface 12a. Thus, light emitted by LED 3 in the forward direction can be more surely guided into leg portions 10. Further, since reflection surface 17a has an evenly shaped cross section around optical axis C of LED 3, light shown by arrows L2 is evenly reflected around optical axis C.

As FIG. 3 shows, the rear surface (the surface on the left side in FIG. 3) of horizontally elongated lighting portion 9 forms knurled surface 18. Knurled surface 18 is in a corrugated shape that forms a plurality of inclined surfaces (surfaces that incline at approximately 45° with respect to the surface of circuit board 2) for guiding the radiating light shown by arrows L2, which is guided in lateral directions from reflection surface 17a, to a front surface, that is, light emission surface 9a, as shown by arrows L4.

With reference to FIG. 1, at least a portion of each of square buttons 6a and horizontally elongated buttons 6b is made of a light transmissible synthetic resin for allowing radiating light from light guiding body 4 to pass through to the front side. Further, square buttons 6a and horizontally elongated buttons 6b are attached to square lighting portions 8 and horizontally elongated lighting portions 9, respectively, and thus can freely exit from and enter into panel main body 6c of panel 6. By pushing square buttons 6a and horizontally elongated buttons 6b inwardly into panel main body 6c, switches 2a on circuit board 2 can be individually depressed via light guiding body 4.

As explained above, according to the vehicle mounted audio apparatus 1 of the embodiment, since the root portion of each of leg portions 10 overlaps area E1 in front of LED 3 (overlapping area E2 is formed), leg portions 10 can receive via overlapping areas E2 light emitted by LED 3 in the forward direction and guide the light to each of light emission surfaces 8a and 9a. Therefore, according to the embodiment, lights emitted by LED 3 in the forward direction can be effectively guided through-leg portions 10 and utilized for lighting light emission surfaces 8a and 9a.

Further, according to the embodiment, since reflection surface 17a is formed at the root portion of each of leg portions 10, light emitted by LED 3 in the forward direction can be guided to leg portions 10, thereby reducing the amount of light escaping from light guiding body 4 in the forward direction, and enabling effective use of the light for lighting light emission surfaces 8a and 9a.

As described in the embodiment, when leg portions 10 have curved or circular cross sections, light that propagates while being repeatedly reflected inside leg portions 10 is prevented from escaping outside of leg portions 10 during each reflection, thereby enhancing the brightness of light emission surfaces 8a and 9a.

Figure 5A:
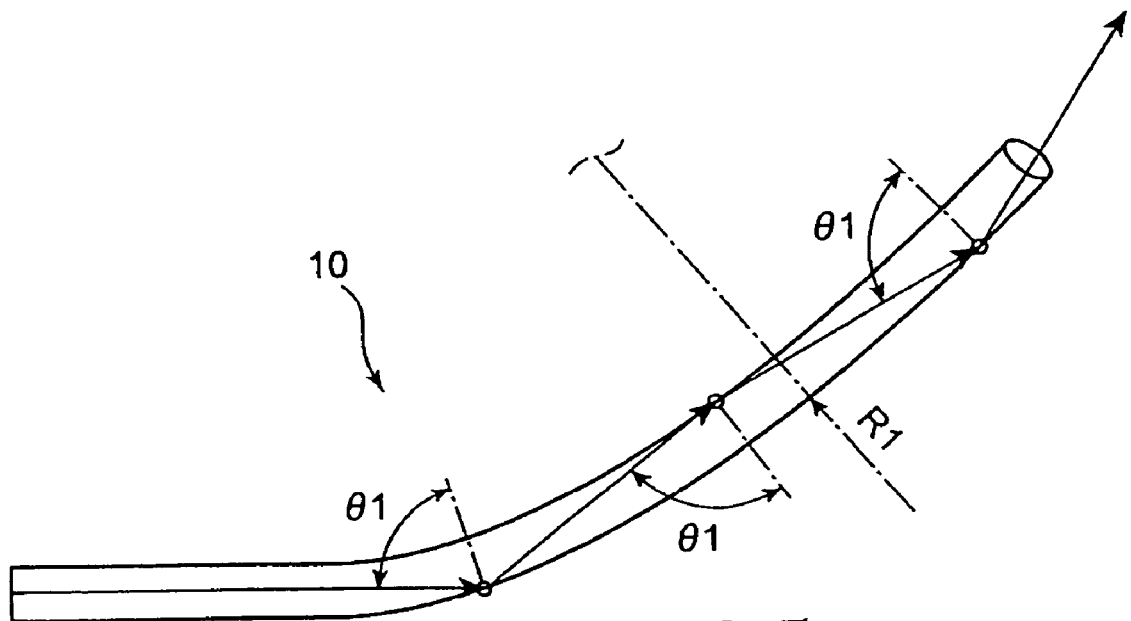
FIG. 5A is schematic view showing light propagating inside a leg portion having a circular cross section according to the audio apparatus of FIG. 1.
Figure 5B:
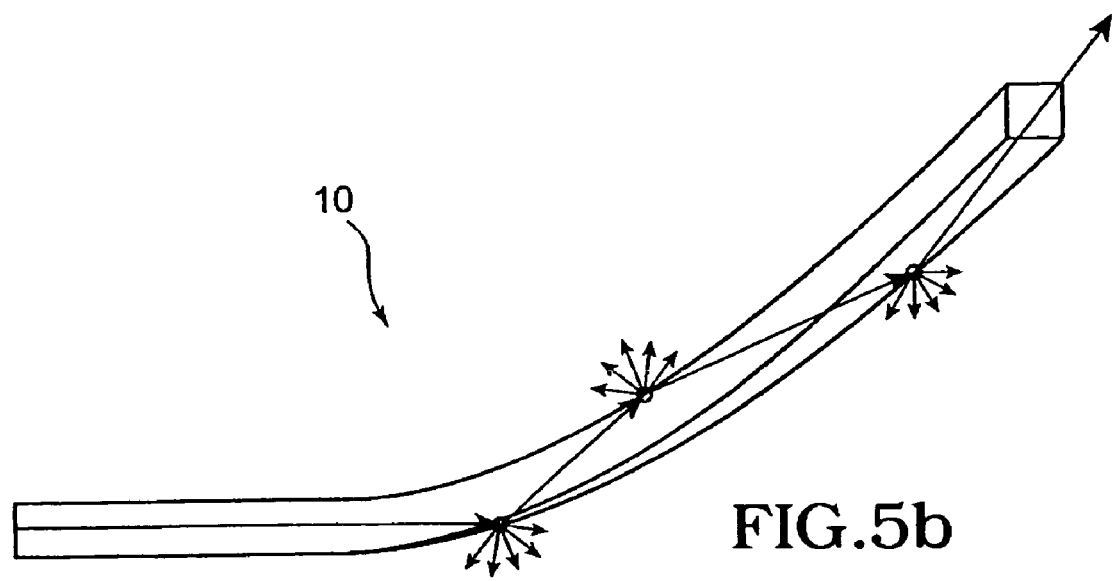
FIG. 5B is schematic view showing light propagating inside a leg portion having a square cross section according to the audio apparatus of FIG. 1.

In other words, as shown by FIG. 5A, light entering each leg portion 10 propagates while being reflected by the exterior wall (the external boundary surface) of leg portion 10. However, as shown by FIG. 5B, when the shape of the cross section of leg portion 10 has an angular portion (FIG. 5B shows an example of leg portion 10 having a square cross section), light entering the angular portion may partially escape outside the leg portions. Therefore, as described in the embodiment, cross sections of leg portions 10 in a circular or curved shape can reduce the amount of light escaping outside the leg portions 10 during each reflection, thereby making it possible to enhance the brightness of light emission surfaces 8a and 9a. Accordingly, in an alternative embodiment of the present invention, the leg portions may include a cross section with a corner portion. However, by making the cross section of each leg portion 10 at least with a curved boundary, not necessarily circular-shaped, the brightness of light emission surfaces 8a and 9a can be even further enhanced and improved.

According to the embodiment, as shown in FIG. 5A, since light paths that smoothly connect base 7 and each of light emission surfaces 8a and 9a can be formed, compared to the case of bent light paths, incidence angle θ1 (the angle formed by the direction from which the light is approaching the exterior wall of the leg portion and the normal line of the exterior wall) of the light, which propagates while being repeatedly reflected inside leg portion 10, can be made larger, thereby ensuring the light is reflected by the exterior wall of leg portion 10, and thus making it possible to reduce the amount of light escaping from leg portion 10.

In the embodiment, square button 6a and horizontally elongated buttons 6b (switch buttons) can be respectively lighted from the rear, thereby enhancing their visibility for a user, and improving the operability of vehicle mounted audio apparatus 1.

Further, in the embodiment, since each leg portion 10 extends with a substantially constant cross-sectional area and cross-sectional shape, compared to a leg portion that has a varying cross-sectional area or cross-sectional shape along its axis line, a larger amount of light can be guided to light emission surfaces 8a and 9a, thereby enhancing the brightness of light emission surfaces 8a and 9a. In other words, when the cross-sectional area or cross-sectional shape varies along the axis line, since the exterior wall at a position where the cross-sectional area or cross-sectional shape varies inclines with respect to the axis line, it can result in a larger incidence angle, with which the light is reflected by the exterior wall. This can increase the amount of light escaping outside of the leg portion 10.

In light guiding body 4, which guides radiating light emitted by LED 3 by using leg portions 10 that connect base 7 to each of lighting portions 8 and 9, the brightness of each of light emission surfaces 8a and 9a can be individually adjusted by the following methods.

The brightness of each of light emission surfaces 8a, 9a may be individually adjusted by a method of adjusting incidence angle θ1. Since incidence angle θ1 can be made larger by increasing curvature radius R1 of each leg portion 10, as shown in FIG. 5, the brightness of each of light emission surfaces 8a and 9a can be adjusted by adjusting curvature radius R1.

The brightness of each of light emission surfaces 8a, 9a may be individually adjusted by a method of adjusting the length of leg portion 10. In light guiding body 4, by adjusting the length of each leg portion 10, the light propagation distance in leg portion 10 can be adjusted, and thus a light attenuation rate associated with the light propagation distance can be adjusted. For example, by reducing the light attenuation rate, the brightness of each light emission surface 8a or 9a can be enhanced. In other words, when a plurality of leg portions 10 have the same lengths, the amount of light guided by each leg portion 10 is substantially the same so that light emission surfaces 8a and 9a can have substantially the same brightness.

The brightness of each of light emission surfaces 8a, 9a may be individually adjusted by a method of adjusting the cross-sectional area of leg portion 10. In light guiding body 4, by adjusting the cross-sectional area of each leg portion 10, the amount of light that can be guided into leg portion 10 can be adjusted. When a plurality of leg portions 10 have the same cross-sectional area, the amount of light guided by each leg portion 10 is substantially the same so that light emission surfaces 8a and 9a can have substantially the same brightness.

The brightness of each of light emission surfaces 8a, 9a may be individually adjusted by a method of treating the surface of leg portion 10. In light guiding body 4, since light propagates while being repeatedly reflected by the exterior wall of leg portion 10, by forming a corrugated shape on the exterior wall of leg portion 10 through a surface treatment, the amount of light that escapes outside from the exterior wall can be increased or decreased, and thus the brightness of each light emission surface 8a or 9a can be adjusted.

The embodiment describes light guiding body 4, of which light emission surfaces 8a and 9a are formed at locations laterally spaced from the front of LED 3. However, it is sufficient that at least some of light emission surfaces 8a and 9a are formed at locations spaced from the front of LED 3. Therefore, the present invention includes configurations in which light emission surfaces 8a and 9a are also located in the front of LED 3.

Further, in the embodiment, indentation 17 is provided to form reflection surface 17a that has an approximate isosceles triangular-shaped lateral cross section, of which the two hypotenuses are formed by a pair of circular arcs that expand as they extend up toward the front surface. However, light guiding body 4 of the present invention may include any appropriate shape of reflection surface 17a. For example, in an alternative embodiment, the conical indentation 17 has an approximate isosceles triangular-shaped lateral cross section with two substantially linear hypotenuses provided to form the reflection surface.

Further, in the embodiment, reflection surface 17a is formed 360° around LED 3. However, the reflection surface may include other appropriate configurations, and in an alternative embodiment, reflection surface 17a may be formed to reflect radiating light within a specific angular range around LED 3, according to the locations of light emission surfaces 8a and 9a.

Further, the embodiment describes indentation 17 that has evenly shaped cross sections around LED 3 and the optical axis C. However, the cross sections of the indentation 17 may include other appropriate configurations in which the cross section is not evenly shaped around the LED 3 and the optical axis. For example, in a case where the intensity of light reflected to a specific direction around optical axis C is larger while the intensity of light reflected to other directions is smaller, indentation 17 may be formed to have a larger reflection surface for reflecting light in a particular direction and to have smaller reflection surfaces for reflecting light in the other directions.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A light guiding body configured to be positioned between a light source and a plurality of areas to be lighted, said light guiding body comprising:
   a base comprising a light intake surface configured to be positioned in front of the light source;
   a plurality of lighting portions, wherein each of said plurality of lighting portions comprises a light emission surface configured to be positioned behind the areas to be lighted;
   a plurality of leg portions extending radially outward from said light intake surface, wherein each of said plurality of leg portions extend from said base to a respective one of said lighting portions, said plurality of leg portions being positioned within a periphery of said light guide body, and wherein said periphery of said light guide body is defined at outer circumferences of said plurality of lighting portions; and
   wherein each of said plurality of leg portions comprises a root portion that at least partially overlaps an area in front of the light source so that each of said plurality of leg portions is configured to receive radiating light entering through said light intake surface, each of said plurality of leg portions being configured to guide light received from said base to a corresponding one of said light emission surfaces, wherein said root portion of each of said plurality of leg portions comprises a reflection surface provided at a location opposing the light source across said light intake surface, wherein the base protrudes from the leg portions and includes a recessed portion for said light source.

2. The light guiding body according to claim 1, wherein each said reflection surface is configured to disperse reflected light emitted in a forward direction by the light source to a lateral direction, and wherein the reflected light is guided by each of said plurality of leg portions to one of said light emission surfaces.

3. The light guiding body according to claim 1, wherein each of said plurality of leg portions comprises a cross section having a curved boundary so that light received from the base propagates while being repeatedly reflected inside each of said plurality of leg portions.

4. The light guiding body according to claim 1, wherein each of said plurality of leg portions defines a curved light path extending between said base and one of said light emission surfaces, so that light received from said base propagates while being repeatedly reflected inside each of said plurality of leg portions.

5. The light guiding body according to claim 1, wherein the areas to be lighted are located at positions laterally spaced from the front of the light source.

6. The light guiding body according to claim 1, wherein said plurality of leg portions are separately provided.

7. The light guiding body according to claim 3, wherein each of said plurality of leg portions comprises a circular cross section.

8. The light guiding body according to claim 1, said plurality of leg portions comprising:
   a plurality of upper leg portions, each said upper leg portion extending from said base to a separate respective lighting portion; and
   a plurality of lower leg portions, all of said lower leg portions extending from said base to one lighting portion.

9. The light guiding body according to claim 1, wherein each root portion comprises at least one indentation positioned at a location opposing the light source at said light intake surface.

10. The light guiding body according to claim 9, wherein a side surface of each of said at least one indentation comprises a reflection surface, each said reflection surface being configured to disperse reflected light emitted in a forward direction by the light source to a lateral direction, and wherein the reflected light is guided by each of said leg portions to one of said light emission surfaces.

11. The light guiding body according to claim 2, wherein each said lighting portion comprises a knurled surface configured to guide light reflected from said reflection surface to said light emission surfaces.

12. A lighting apparatus comprising:
   the light guiding body according to claim 1;
   a light source that emits light to the light guiding body; and
   a panel that covers said light guiding body and said light source;
   wherein areas to be lighted which are laterally spaced from the front of the light source, are lighted from behind by said light emission surfaces of the light guiding body, the light emission surfaces being lighted by radiating light emitted by the light source.

13. The lighting apparatus according claim 12, wherein said panel comprises a panel main body and a plurality of switch buttons configured to be depressed relative to the panel main body, and wherein the light guiding body is configured to individually light each of the switch buttons through the lighting portions that are respectively provided behind the switch buttons.

14. In combination:
   a pair of light guiding bodies, each light guiding body in accordance with claim 1; and
   a connection plate connecting said pair of light guiding bodies.

15. The lighting guiding body according claim 1, wherein longitudinal extending portions of the leg portions extend perpendicular to a longitudinal axis of said recessed portion provided in the base.

16. The lighting guiding body according claim 12, wherein longitudinal extending portions of the leg portions extend perpendicular to a longitudinal axis of said recessed portion provided in the base.

17. The lighting guiding body according claim 14, wherein longitudinal extending portions of the leg portions extend perpendicular to a longitudinal axis of said recessed portion provided in the base.

18. The lighting guiding body according to claim 1, wherein said reflection surface extends 360° around said light source.

* * * * *